(12) United States Patent
Pandit et al.

(10) Patent No.: US 8,892,561 B2
(45) Date of Patent: *Nov. 18, 2014

(54) REFINEMENT AND CALIBRATION MECHANISM FOR IMPROVING CLASSIFICATION OF INFORMATION ASSETS

(71) Applicant: International Business Machines Corporation, Armonk, NY (US)

(72) Inventors: Sushain Pandit, Austin, TX (US); Charles K. Shank, Downingtown, PA (US); Charles D. Wolfson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/886,404

(22) Filed: May 3, 2013

(65) Prior Publication Data

US 2013/0246321 A1    Sep. 19, 2013

Related U.S. Application Data

(63) Continuation of application No. 13/249,953, filed on Sep. 30, 2011.

(51) Int. Cl.
    G06F 17/30     (2006.01)
    G06N 99/00     (2010.01)
    G06Q 10/06     (2012.01)

(52) U.S. Cl.
    CPC .............. *G06N 99/005* (2013.01); *G06Q 10/06* (2013.01)
    USPC ...................... 707/738; 707/740; 707/E17.09

(58) Field of Classification Search
    CPC .................................................. G06F 17/30707
    USPC ..................................... 707/738, 740, E17.09
    See application file for complete search history.

(56) References Cited

U.S. PATENT DOCUMENTS

| | | |
|---|---|---|
| 2008/0027769 A1 | 1/2008 | Eder |
| 2008/0086322 A1 | 4/2008 | Wallace |
| 2008/0086428 A1 | 4/2008 | Wallace |
| 2008/0086509 A1 | 4/2008 | Wallace |
| 2009/0234864 A1 | 9/2009 | Ellis et al. |
| 2010/0070448 A1 | 3/2010 | Omoigui |
| 2010/0100546 A1 | 4/2010 | Kohler |
| 2013/0086076 A1 | 4/2013 | Pandit |

OTHER PUBLICATIONS

Howe, Free On-Line Dictionary of Computing, 1997, p. 1.*
Tao Gu et al., "An Ontology-based Context Model in Intelligent Environments," IEEE Transactions on Information Technology in Biomedicine, Mar. 2011, vol. 15(2): pp. 324-333.
Ramon Hervas et al., "A Context Model based on Ontological Languages: a Proposal for Information Visualization," Journal of Universal Computer Science, 2010, vol. 16(12): pp. 1539-1555.

* cited by examiner

Primary Examiner — Albert Phillips, III
(74) Attorney, Agent, or Firm — Patterson & Sheridan, LLP

(57) ABSTRACT

Techniques are described for refining the manual classification of assets classified or categorized using the terms of a business glossary. A semantic refinement mechanism is used to refine the manual classification of such assets, as well as subsequently evaluate the refined asset classifications. Further, the refined asset classifications may be used as a training set for a machine learning classifier. That is, should the classification of an asset contributing to a refinement change, the refinement based on that classification may be undone, at least in some cases.

6 Claims, 8 Drawing Sheets

REFINEMENT AND CALIBRATION MECHANISM FOR IMPROVING CLASSIFICATION OF INFORMATION ASSETS

CROSS-REFERENCE TO RELATED APPLICATIONS

This application is a continuation of co-pending U.S. patent application Ser. No. 13/249,953, filed Sep. 30, 2011. The aforementioned related patent application is herein incorporated by reference in its entirety.

BACKGROUND

Embodiments of the invention are generally directed to an approach for managing the classification of assets in a business glossary. More specifically, embodiments of the invention provide a variety of techniques for refining the manual classification or categorization of assets relative to a business glossary based on a set of attributes associated with the assets and the classification of other, similar assets.

Large organizations frequently use a variety of software applications and systems to define and manage a business glossary. The business glossary itself may provide a controlled vocabulary of terms used within the organization (and across sub-organizations). Terms in the business glossary represent the major information concepts in an organization and categories are used to organize terms into hierarchies. The business glossary allows data analysts, business analysts and subject matter experts to create a rich glossary of business terms, hierarchies and relationships. The business glossary links business concepts to technical metadata and can expose these linkages across the entire enterprise using a variety of user interfaces.

For example, a web-based tool may include a user interface for creating, managing, and sharing the controlled vocabulary of the business glossary. In addition to maintaining the controlled vocabulary, such an interface may provide a classification scheme along with a taxonomy of terms and categories and allow a steward to assign terms to business assets. "Stewards" generally refers to people within the organization with responsibility for a given information asset—typically a subject matter expert tasked with managing a group of terms. This assignment is often manual, where the steward relies on his domain knowledge to perform this task.

However, it is well known that manual classification often results in naive assignments based on any appropriate class (term/category) that a steward identifies. That is, rather than examining the existing classes present in the glossary, a steward may assign assets to classifications on a "first best fit" basis. While this results in an accurate classification, it may be unnecessarily general for the classified asset and inconsistent with classifications for similar assets. For example, a steward could assign an asset of a delivery truck to an asset classification of "vehicle" or "vehicle-truck," when a further term of "vehicle-truck-delivery" existed in the business glossary. Further, when two organizations merge (or one organization splits into smaller units) new assets may need to be classified, terms in distinct business glossaries may need to be merged and reconciled, etc.

Various approaches to automatically assign assets to a particular class have been made as well. Automatic classification mechanisms typically rely on external descriptions about the asset, above and beyond what already exists in a glossary and then apply some natural language processing techniques to extract features that may be useful in classification. Another approach has been to try to train a classifier based on the existing manual classifications as a training dataset. However, the training itself relies on the manual assignments, which is often be problematic due to the reasons mentioned above.

SUMMARY

One embodiment of the invention provides a computer-implemented method for refining assets classified using terms in a business glossary. This method may generally include receiving a plurality of assets, each asset having a classification of a term selected from a business glossary. The business glossary provides a hierarchy of controlled vocabulary of terms used within an organization and each asset is characterized in database records using a set of attributes selected from a domain ontology. This method may also include evaluating, by operation of one or more computer processors, the classification assigned to each of the plurality of assets against a set of refinement criteria and refining the classification assigned to at least a first asset, wherein the first asset satisfies the set of refinement criteria.

In a particular embodiment, this method may further include storing a reference to the first asset and to at least a second asset, wherein the second asset contributed to the refinement to the first asset, according to the set of refinement criteria. Upon determining the second asset has been reclassified, the refined classification assigned to the first asset may be reevaluated against the refinement criteria and undone if the first asset no longer satisfies the set of refinement criteria. In a particular embodiment, the refinement criteria includes determining that the classification of the second asset is a descendant of the classification assigned to the first asset in the business glossary, and that each attribute of the second asset has a more general value than the corresponding attribute in the first asset, relative to the ontology.

Additional embodiments include a computer-readable storage medium storing an application, which, when executed on a processor, performs the above recited method as well as a system having a processor and a memory storing an enterprise information asset management application program, which, when executed on the processor, performs the above recited method.

BRIEF DESCRIPTION OF THE DRAWINGS

So that the manner in which the above recited aspects are attained and can be understood in detail, a more particular description of embodiments of the invention, briefly summarized above, may be had by reference to the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
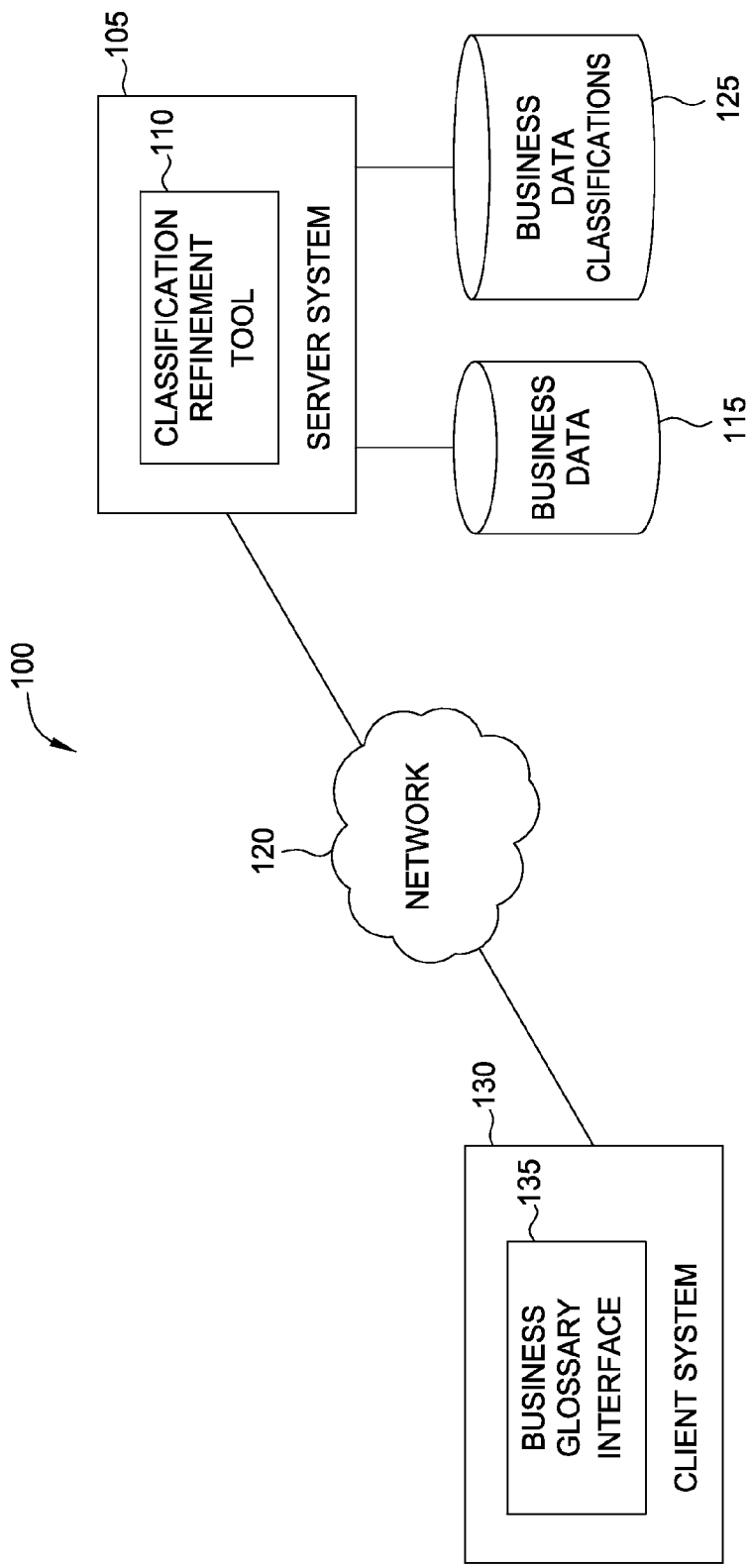
FIG. 1 illustrates an example computing infrastructure used to manage the classification of assets using terms in a business glossary, according to one embodiment of the invention.

Embodiments of the invention provide techniques for refining the manual classification of assets classified or categorized using the terms of a business glossary. In one embodiment, a semantic refinement mechanism is used to refine the manual classification of such assets, as well as subsequently evaluate the refined asset classifications. Further, the refined asset classifications may be used as a training set for a machine learning classifier. Training the machine learning classifier using the refined asset classifications results in a classifier that may be used to more accurately perform automatic asset classification. Doing so allows datasets to be more rapidly merged into a common business glossary. The refined set of classifications may also be used by a variety of business analytics tools to analyze and evaluate an organization across a variety of metrics.

In one embodiment, the semantic refinement mechanism receives a set of assets manually classified by a steward (or other user). The steward assigns a term from a business glossary to the asset, based on a set of metadata attributes describing the asset. For example, a database may provide a row of attributes for each asset classified by the steward. Further, the range of attributes available to describe assets may be related to one another using an ontology. In one embodiment, the semantic refinement mechanism may evaluate the classification assigned to a given asset to decide whether to refine that classification, i.e., to decide whether the asset should be classified using a more specific term from the business glossary. As described in greater detail below, e.g., assume a steward has assigned a manual classification to a first asset. In such a case, if the semantic refinement mechanism determines (i) that there is classification assigned to another asset that is a descendent of the classification assigned to the first asset, and (ii) that each attribute of the first asset is at a lower level in the ontology than the corresponding attribute in the asset classified using the descendent term, and (iii) that a difference of the weights assigned to users making the classifications of the assets being evaluated exceeds a tunable threshold, then the classification of the first asset may be refined to the more specific one.

In one embodiment, a probability distribution may be used to ultimately select a refinement for the classification of an asset that satisfies the conditions listed above. As described in greater detail below, the more probable classification (i.e., either the original classification or a potential refinement identified using the conditions above) may be selected as the one that has been manually assigned by many users, resulting in a higher count for that classification in the probability distribution. However, to decide whether it makes sense at all to refine the classification assigned to the first asset, the classification needs to satisfy the conditions listed above. These conditions ensure that the asset being evaluated is similar to the one that was previously classified under the more specialized classification.

The business glossary may itself provide be an evolving dataset of assignments and re-assignments of assets to terms over time. For example, a new acquisition made by an enterprise may result in thousands of new business definitions in the business glossary, along with a set of assets classified using such terms. Conversely, a disposition of a sub-organization could result in the sunset of a number of terms in the business glossary. In these cases, the semantic refinement mechanism may facilitate the refinement of classifications assigned to assets being merged under a common business glossary (or refine new classifications assigned to terms after a original classification has been sunset from the business glossary and a new manual classification has occurred).

Further, a feedback-enabled weighted calibration mechanism may be used to evaluate refinements made using the semantic refinement mechanism. For example, assume the classification assigned to a first asset is refined by the semantic refinement mechanism based on the manual classification of an underlying group of one or more assets. Should the classification of these underlying asserts change, the feedback-enabled weighted calibration module may evaluate the refined classification of the first asset—potentially undoing the refinement. In one embodiment, the semantic refinement mechanism may be run in an iterative manner. Each time asset classifications are refined, the feedback-enabled weighted calibration mechanism may evaluate whether other classifications should be undone as a result.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN) or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates an example computing infrastructure used to manage the classification of assets using terms in a business glossary, according to one embodiment of the invention. As shown, the computing infrastructure 100 includes a client system 130 and a server system 105, each connected to a network 120 (e.g., the Internet).

Additionally, the server system 105 is shown accessing database systems 115, 125. Specifically, business data 115 and business data classifications 125. Note, while illustrated as separate elements, database systems 115 and 125 may be database applications running on the server system 105 or on computing systems accessed over a data communications network. In this example, the business data 115 corresponds to data specifying attributes of business assets and business data classifications 125 correspond to classifications assigned to such business assets, relative to a business glossary. As a relatively simple example, assume a business has a large fleet of vehicles. In such a case, the business data 115 could include a variety of attributes related to each vehicle such as make, model, color, year, etc. Further, the business could maintain a business glossary and allow a user of the client system 130 (e.g., a steward) to assign a classification from the business glossary to each business asset (i.e., to each vehicle in this example).

As shown, the client system 130 includes a business glossary interface 135. The client system 130 is included to be representative of a variety of computing devices, e.g., a desktop computer, laptop computer, or tablet device. In one embodiment, the business glossary interface 135 may be a web browser used to access a web application. Thus, the client system 130 may be any computing device capable of accessing and rendering data from a web server. The web application (i.e., the business glossary interface 135) itself may allow the user to view, edit and manage a business glossary, as well as assign terms in the glossary to business assets. The server system 105 may be configured with the appropriate applications to provide the web application, e.g., a web server, application server, and database application, etc. Of course, one of ordinary skill in the art will recognize that a variety of software architectures may be used to provide users with access to a business glossary, in addition to the client/server architecture shown in FIG. 1.

Illustratively, the server system 105 includes a classification refinement tool 110. In one embodiment, the refinement tool 110 may be configured to evaluate manual classifications of terms from a business glossary to assets in order to identify refinements to such classifications. Further, as terms are added (or removed), as new classified assets are added to business data 115 (or assets are manually reclassified,) the classification refinement tool 110 may evaluate whether new refinements should be made (or previous refinements should be redone). Thus, the classification refinement tool 110 may operate in an iterative matter. In one embodiment, as described in greater detail below, the classification refinement tool 110 may include a semantic refinement module and a feedback-enabled weighted calibration module.

Figure 2:
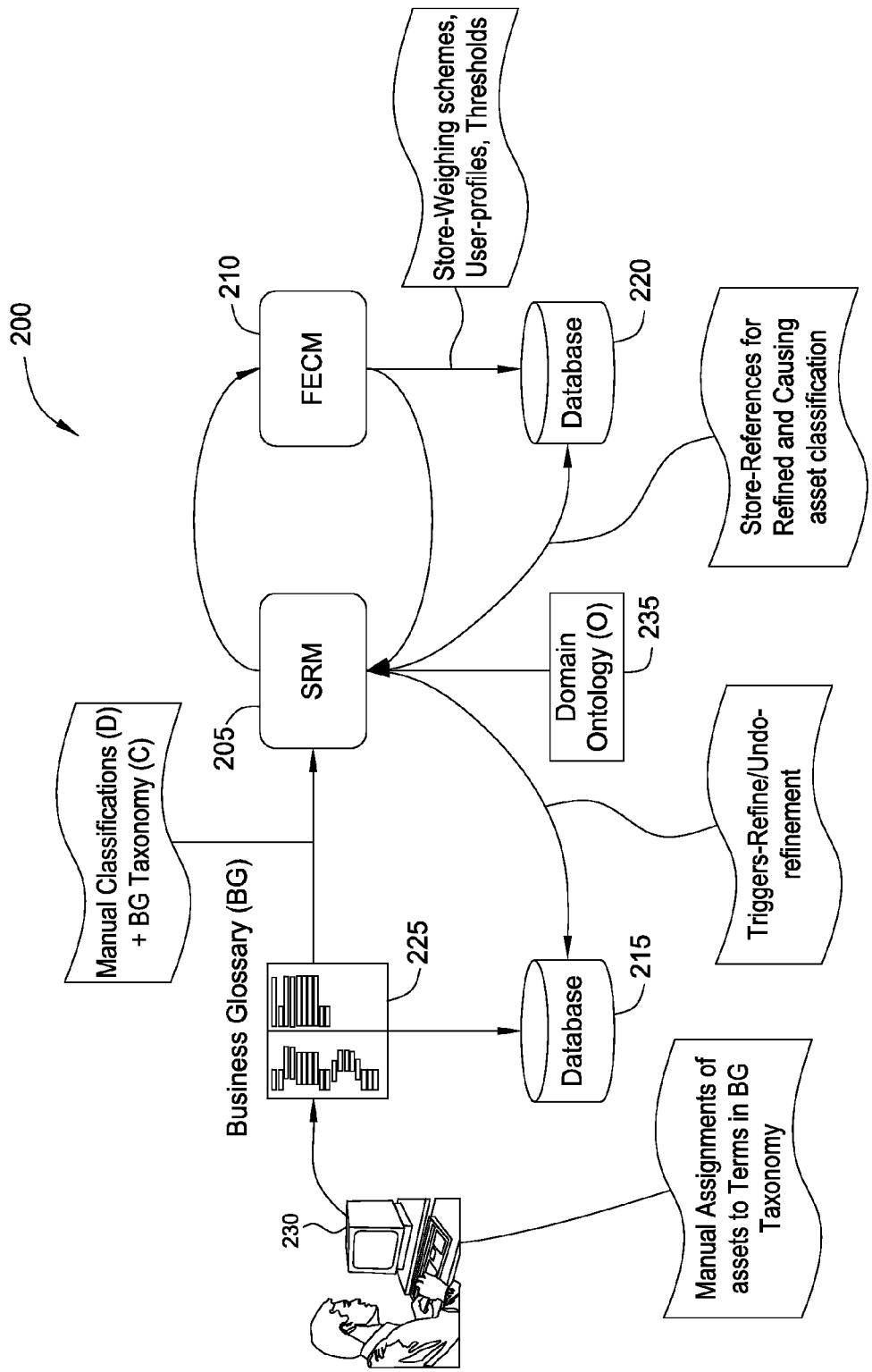
FIG. 2 illustrates a high-level architecture of a system for refining assets classified using terms in a business glossary, according to one embodiment of the invention.

For example, FIG. 2 illustrates a high-level architecture 200 of a system for refining asset classifications manually assigned using terms in a business glossary 225, according to one embodiment of the invention. As shown, the architecture 200 includes a semantic refinement module (SRM) 205 and a feedback-enabled weighted calibration module (FECM) 210. In this example, a user 230 manually assigns terms in the business glossary 225 to business assets, where data records in the database 215 represent the business assets. The data records may provide a set of attributes describing a given business assets using terms selected from a domain ontology 235. The manual classifications of business assets made by the user 230 are stored in database 215. The business glossary itself may provide a hierarchy of terms to assign to assets.

In one embodiment, the SRM 205 is provided the business glossary 225 and the manual classifications made by the user 230. Further, the SRM 205 may be configured to evaluate the manual classifications made by the user 230 to determine whether to refine any of the manual classifications. More specifically, the SRM 205 may determine, in some cases, to refine the term assigned to an asset with a descendant of that term. That is, the SRM 205 may replace a term assigned to an asset by the user 230 with one of that term's children (or its children's children, etc.), in the business glossary 225, thereby providing a more specific classification of that asset. In one embodiment, the SRM 205 may identify a first asset as a candidate for refinement by comparing the attributes of the first asset with the attributes of assets assigned a descendent classification relative to the term assigned to the first asset. That is, when two assets share similar attributes, as determined relative to the domain ontology 235, the asset with the more specific asset classification (from the business glossary 225) provides a possible refinement classification for the other asset. In one embodiment, the SRM 205 may compare weight associated with the users which manually classified the two assets to determine whether to refine the classification of the asset with the less-specific classification. For example, the SRM 205 may give more weight to a classification made by a recognized subject matter expert (SME) or experienced data steward over one made by other users.

The SRM 205 may also store references to any refined classifications of business assets in database 220, as well as reference to the assets which caused the refinement. In turn, the FECM 210 may identify when assets manually classified by the user 230, or when asset classifications are refined by the SRM 205, should result in the refined classification assigned to other assets being undone. For example, if the SRM relies on the classification of a first asset to refine the classification a second, and the classification of the first asset is subsequently changed, the FECM 210 may invoke the SRM 215 to determine whether the refined classification of the first asset should be undone.

Figure 3:
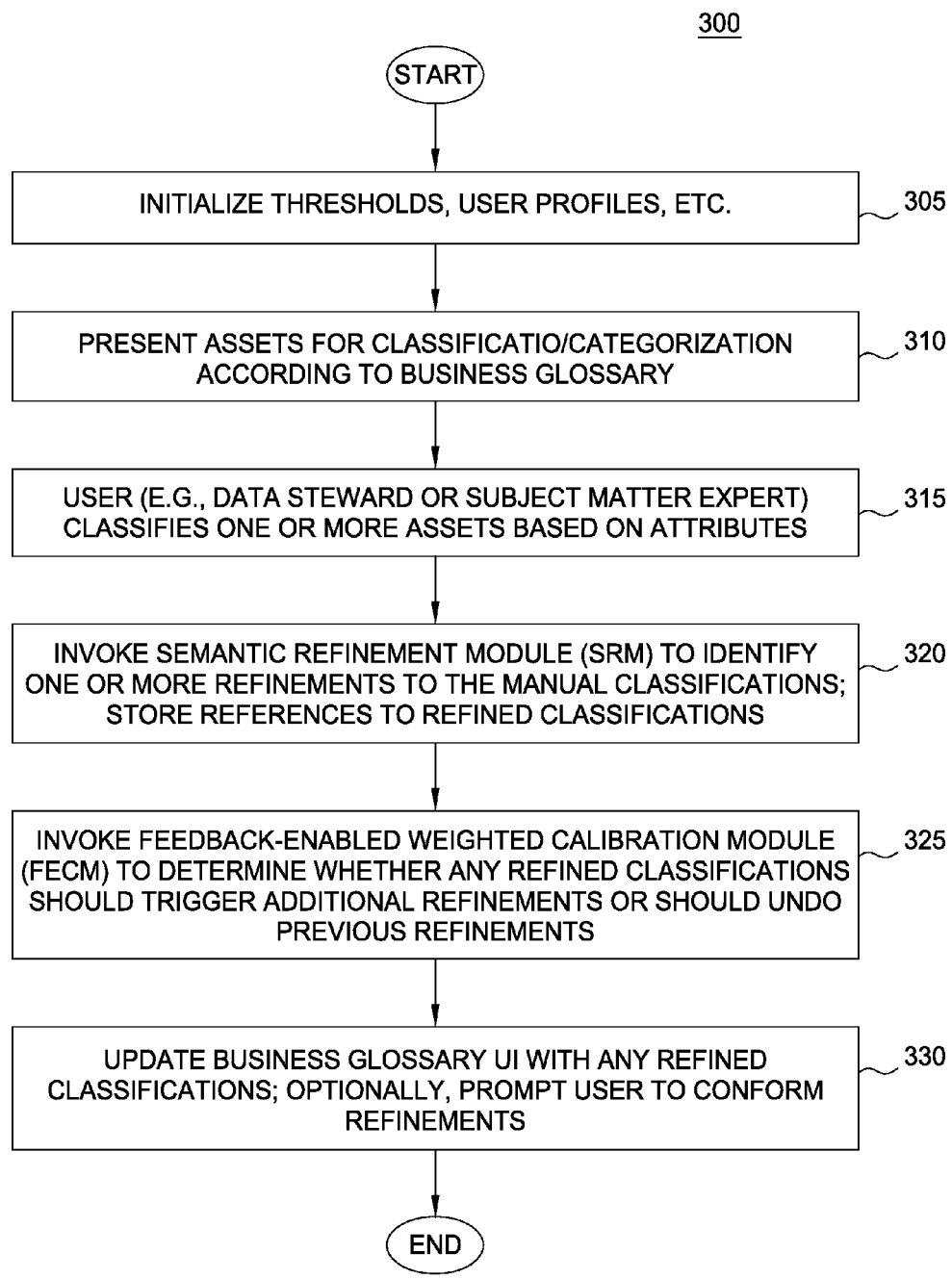
FIG. 3 illustrates a method for classifying terms in a business glossary, according to one embodiment of the invention.

FIG. 3 illustrates a method 300 for classifying terms in a business glossary, according to one embodiment of the invention. As shown, the method 300 begins at step 305 where the classification tool initializes user profiles, thresholds for refining classifications, and other data structures. Additionally, the classification tool may also identify a collection of assets to be classified (e.g. a set of database records providing the attributes of each asset to be classified) and the relevant business glossary.

At step 310, the classification tool may present assets for classification or categorization to a data steward or subject matter expert. For example, as noted above, the user may interact with a web browser to access the classification refinement tool 110 implemented as a web-based application. At step 315, the subject matter expert or data steward assigns a classification to each asset from the business glossary. Continuing with the example first mentioned above, the table below shows a set of example assets and a classification manually assigned by a user.

TABLE I

| | Assets | | |
|---|---|---|---|
| Asset # | Attribute 1 (Vehicle Color) | Attribute 2 (Vehicle Type) | Manual Classification |
| 1 | Blue | American SUV | Painted SUV |
| 2 | Light Blue | American SUV | Lightly Painted Car |
| 3 | Light Red | American SUV | Painted Car |

Figure 7:
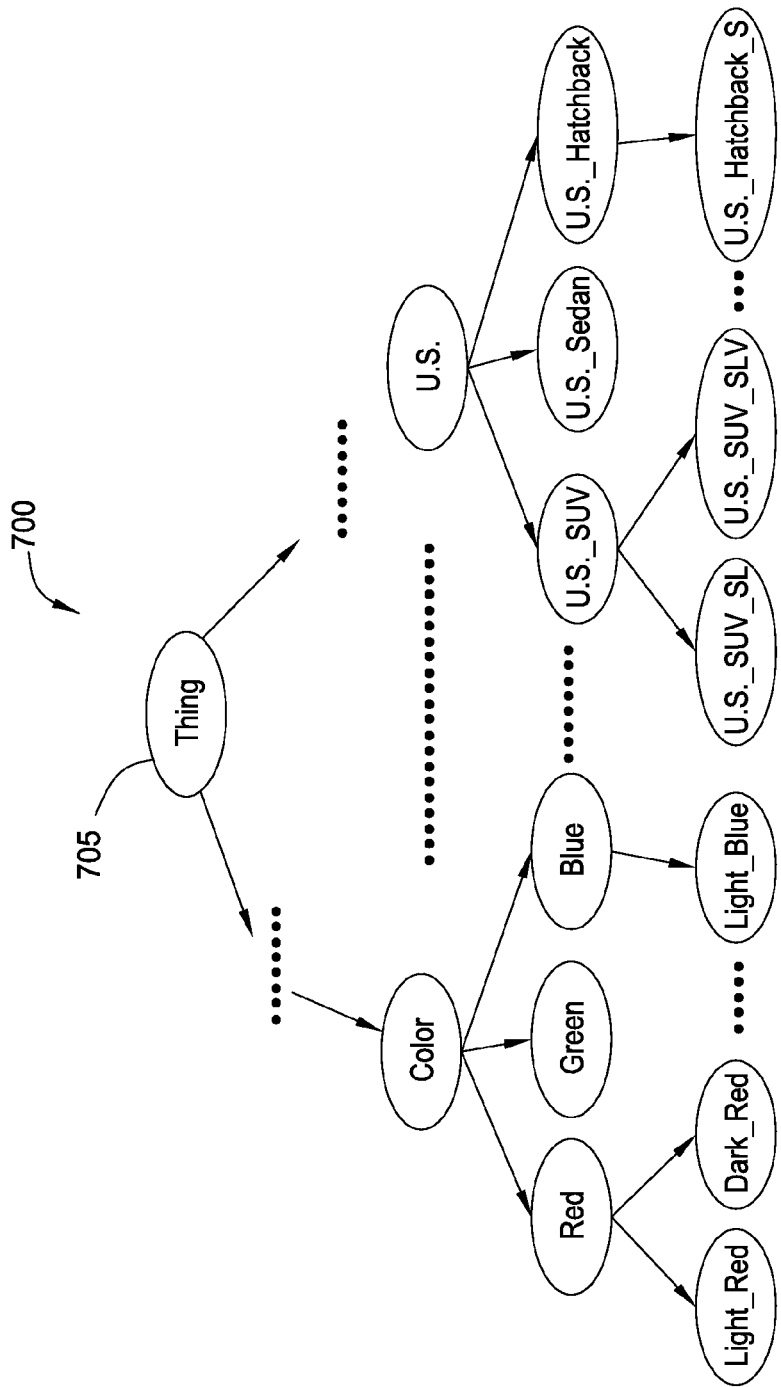
FIG. 7 illustrates a portion of an exemplary ontology used to refine assets classified or categorized using terms of a business glossary, according to one embodiment of the invention.

Note, in this example the attributes from are selected relative to a domain ontology, a portion of which is shown in FIG. 7. More specifically, FIG. 7 shows an exemplary domain ontology 700 relating terms from a root node 705 of "things" into more specific elements such as "car" "painted car" and "SUV." The terms from the domain ontology 700 are used to provide the attributes of the assets in Table I.

Figure 6:
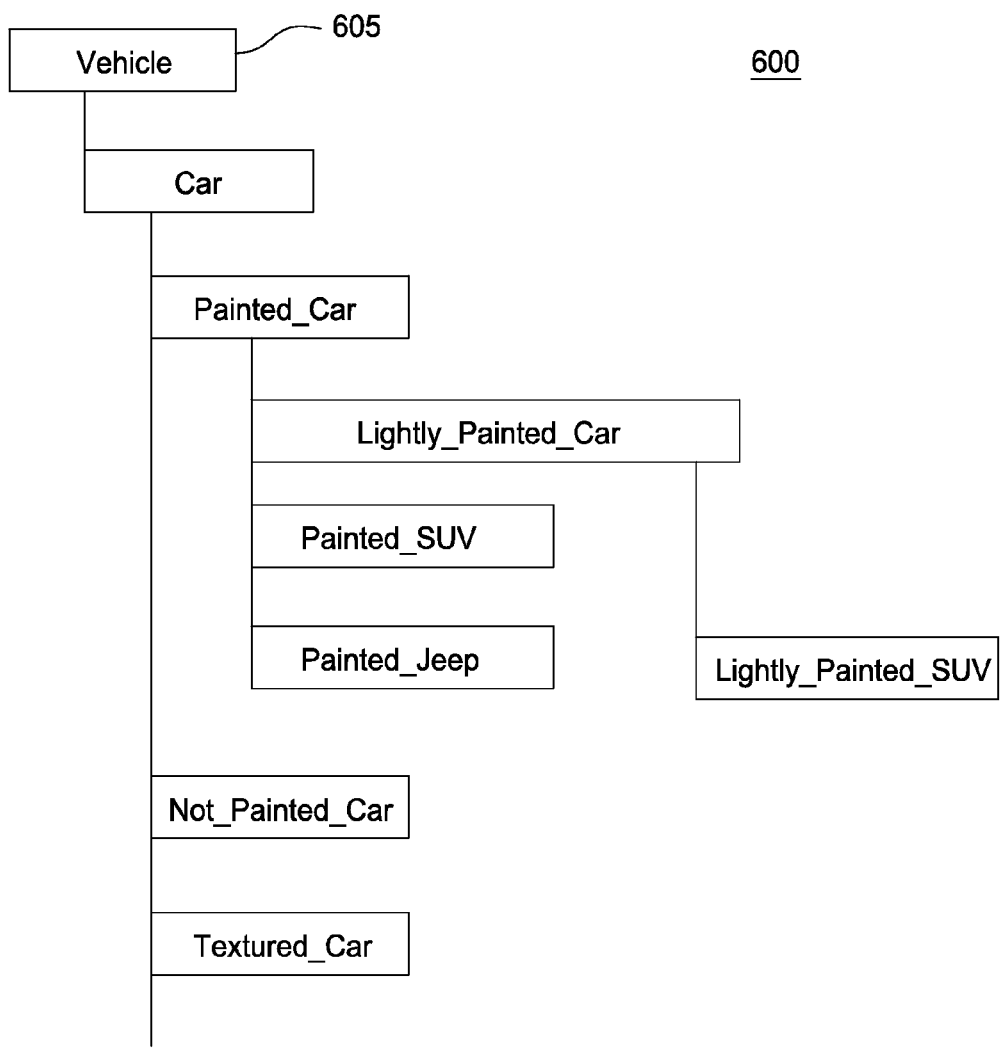
FIG. 6 illustrates a portion of an exemplary business glossary, according to one embodiment of the invention.

Also, the classifications assigned by the user are selected from the example business glossary shown in FIG. 6. More specifically, FIG. 6 shows an example business glossary 600, which provides a hierarchical taxonomy of terms to assign to the business assets. In the example of FIG. 6, business glossary 600 shows a hierarchy of terms used to classify vehicles, starting from the most general term of "vehicle," which has a sub classification of "car," etc. As noted, once a threshold number of assets are manually classified such assets may be used as a training set for a machine learning classifier, which, once trained, can be used to classify additional assets from the dataset. Further, the resulting asset classifications may be used by a variety of other data analytics tools.

However, while the classifications manually assigned by the user are generally presumed to be "correct," in some cases the initial manual classifications are inaccurate, or at a minimum, imprecise given the available precision in the business glossary. For example, Asset #3 in Table I has been assigned to a correct, but very general category (Painted Car), even though there are multiple more-specific categories in the business glossary 500 shown in FIG. 5, e.g., "Painted_SUV" and "Lightly_Painted_Car."

Accordingly, once the user has manually assigned a set of classifications to assets (i.e., following step 315), the classification refinement tool may invoke the SRM to evaluate the manually assigned asset. That is, at step 320, the SRM may determine whether to refine any of the manually assigned asset classifications. If so, the SRM may refine the classification assigned to one or more assets as well as store references in the database to both the refined assets and the assets upon which a given refinement was based.

Following an iteration of the SRM (and any resulting asset classification refinements), at step 325, the classification refinement tool may invoke the FECM. In turn, the FECM may determine whether the current classification of any of the assets needs to be reevaluated as a result of the SRM refining an asset or as the result of a user undoing a refinement or otherwise changing the classification of an asset. For example, assume the SRM refines the classification of a first asset, based on the classification of a second and third asset. In such a case, should a user change the classification of the second or third asset, then the FECM may identify the first asset for reevaluation. In one embodiment, the FECM may invoke the SRM to reconsider the refinement made to the first asset.

Note, the process may continue iteratively until reaching a steady state. For example, assume the SRM undoes the refinement to the first asset (based on changes to the classifications of the second and/or third assets). Following this iteration of the SRM, the FECM could then determine whether the (now undone) refined classification of the first asset had itself previously contributed to the refinement of other assets. If so, the FECM could invoke the SRM to reconsider the classification of assets previously refined based on the (now undone) refinement to the classification of the first asset. And if such refinements are undone, another iteration would occur. At step 330, a steady state is reached, any asset classifications refined using the SRM (or undone by the FECM), may optionally be presented to a user for confirmation, prior to being committed to the database.

Figure 4:
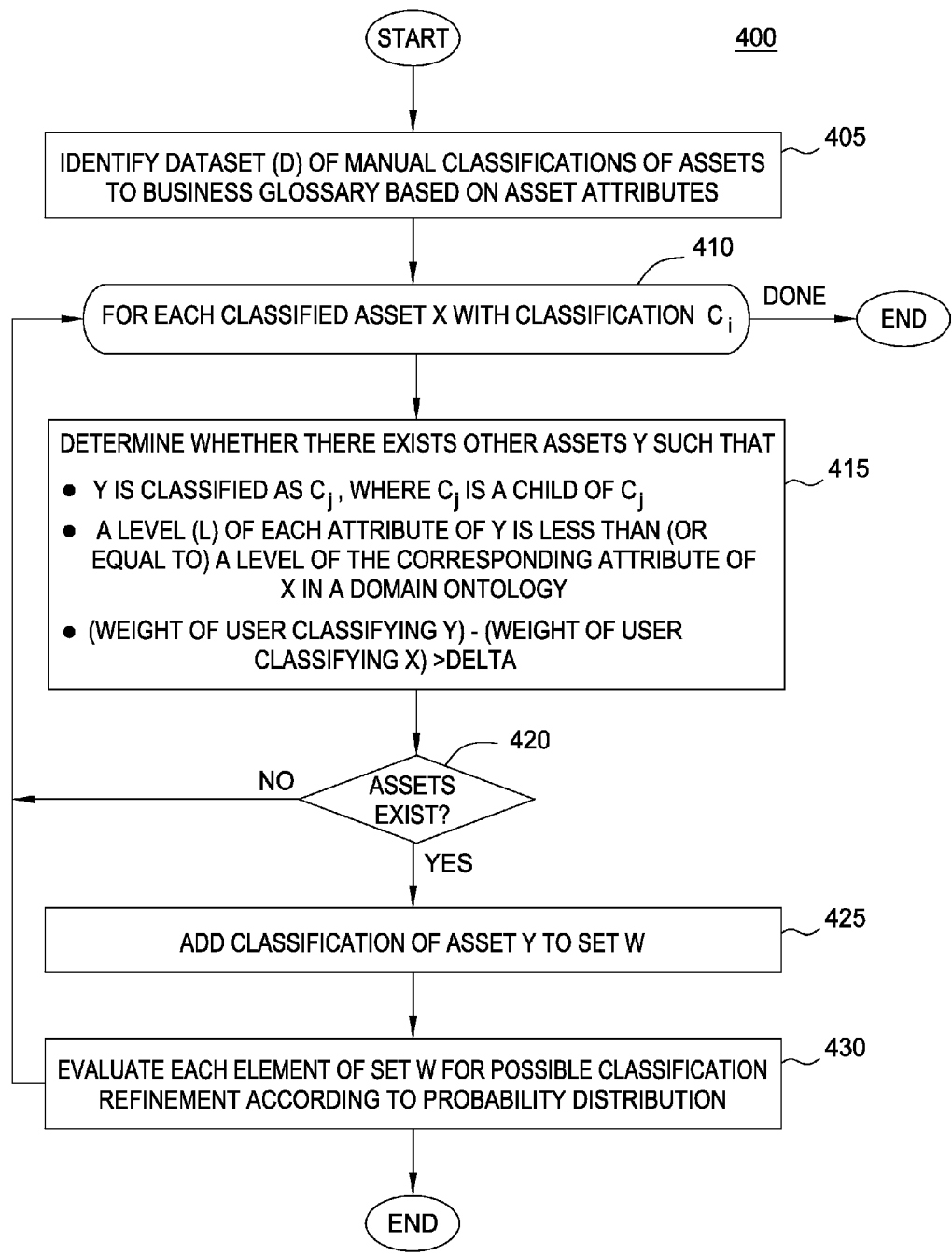
FIG. 4 illustrates a method for refining assets classified using terms in a business glossary, according to one embodiment of the invention.

FIG. 4 illustrates a method 400 for refining assets classified using terms in a business glossary, according to one embodiment of the invention. In one embodiment, the semantic refinement module (SRM), discussed above, may implement the method 400. As shown, the method 400 begins at step 405 where the SRM identifies a dataset (D) of assets manually classified by a data steward or other user. At step 410, a loop begins where the SRM evaluates the manual classification assigned to each asset in dataset (D) to identify candidates for refinement.

At step 415, the SRM evaluates a set of conditions to determine whether a given asset is a candidate for refinement. In a particular embodiment, the conditions include (i) determining, for a given asset X being considered, whether there is classification assigned to another asset Y in dataset (D) that is a descendent of the classification assigned to the asset X, (ii) that each attribute of the asset X is at a lower level in the ontology than the corresponding attribute in the asset classified using the descendent term, and (iii) that a difference of weights assigned to the users assigning the classifications to assets X and Y exceeds a specified magnitude. At step 420, if such an asset (or assets) Y is present in dataset D, then at step 425, the classification of each such asset Y is added to a set W as a possible refinement to the classification of asset X. If no assets satisfy the conditions of step 415, the method 400 returns to step 410 to select another asset from the dataset D to evaluate.

Otherwise, at step 430, one of the refinements in set is selected as a refined classification for the asset X. For example, in one embodiment the SRM may replace the original classification ($C_i$) of asset X with one of the possible classifications ($C_{refined}$) from the set W as per the following probability distribution:

$$\Pr(C_{refined}) = \text{Count}(C_{refined})/\text{Sum of the counts of all elements in Children}(C_i)$$

According to the probability distribution (Pr), the final refinement to the classification of an asset X is selected as the one (from set W) that has been manually used by the maximum number of users/stewards (resulting in the highest Count ($C_{refined}$) in order to classify other assets in the Glossary. Going by this measure (of highest count) provides maximum evidence that the asset classification that SRM used as the cause for computing the refinement, is indeed one that can be maximally relied upon (to the extent possible by the prior asset classification knowledge present in the Glossary) because many users/stewards used it consistently during prior manual asset classifications. Following step 430, the method returns to step 410 to select another asset from the dataset D to evaluate, until the SRM has considered each asset in dataset D for possible refinement.

As an example, returning again Table I, for the assets #1 and #2, the conditions specified at step 415 of method 400 are not satisfied, since there does not exist any classification that belongs to the children of Painted_SUV or Lightly_Painted_Car in the business glossary 600 shown in FIG. 6. In contrast, for the asset #3, the conditions specified at step 415 of method 400 is satisfied as follows:

Both Painted_SUV and Lightly_Painted_Car are children of Painted_Car

The level in the ontology 700 of FIG. 7 of the attribute values for asset #3 are each greater than the levels of the corresponding attribute values of asset #1 and #2, specifically:

Light_Red is at least as deep as Light_Blue or Blue.

American_SUV is at least as deep as American_SUV, etc.

Note, for this example, assume that the weights of the users that assigned the classifications to assets #1, #2 and #3, satisfy the condition that the difference in weights assigned to users assigning the classifications to assets X and Y exceed a specified magnitude. For example, assume a weight of the user who performed the manual classification for asset X is 0.2 (someone whom the organization just hired as a data steward and has <1 year of relevant work experience) and that of the one who performed manual classification for asset Y is 1.0 (a veteran data steward who has been experienced with the organization for >5 years) and the specified magnitude (threshold) is 0.5. In this case, the difference (0.2−1.0=0.8) exceeds 0.5.

As a result of satisfying the conditions of step 415, in this example, dataset W contains the classifications of assets #1 and #2. That is, W contains Painted_SUV and Lightly_Painted_Car. In this case, the probability of each of these classifications from the business glossary is equal (Pr=1/2). As a result, the SRM could refine the assignment of asset #3 from Painted_Car to either one of the other two categories with equal probability (i.e., the SRM could select one at random). Alternatively, the SRM could store a reference to asset X indicating that it is a suspect for refinement and could be calibrated in one of the later iterations if the probability (Pr) changes to favor one of the possible refinements changes, e.g., in response to additional assets being manually classified, adding to the count of either Painted_SUV or Lightly_Painted_Car in W when SRM evaluates asset #3.

As noted, once the SRM refines the classifications of assets, the dataset D may be evaluated to determine whether the classification of other assets should be undone (or themselves refined). Further, the business glossary (and the classified assets) provides an evolving data-set with assignments and re-assignments of assets to terms occurring over time. For example, a new acquisition may result in new assets being acquired and/or in new terms in the business glossary. Conversely, a disposition of a sub-organization can result in some assets (and corresponding classifications) being removed or terms being sunset from the business glossary. To address the evolving dataset and business glossary, the FECM may evaluate whether to undo refinements made by SRM to a given asset when the underlying assets, classifications, and/or terms in the business glossary change.

Figure 5:
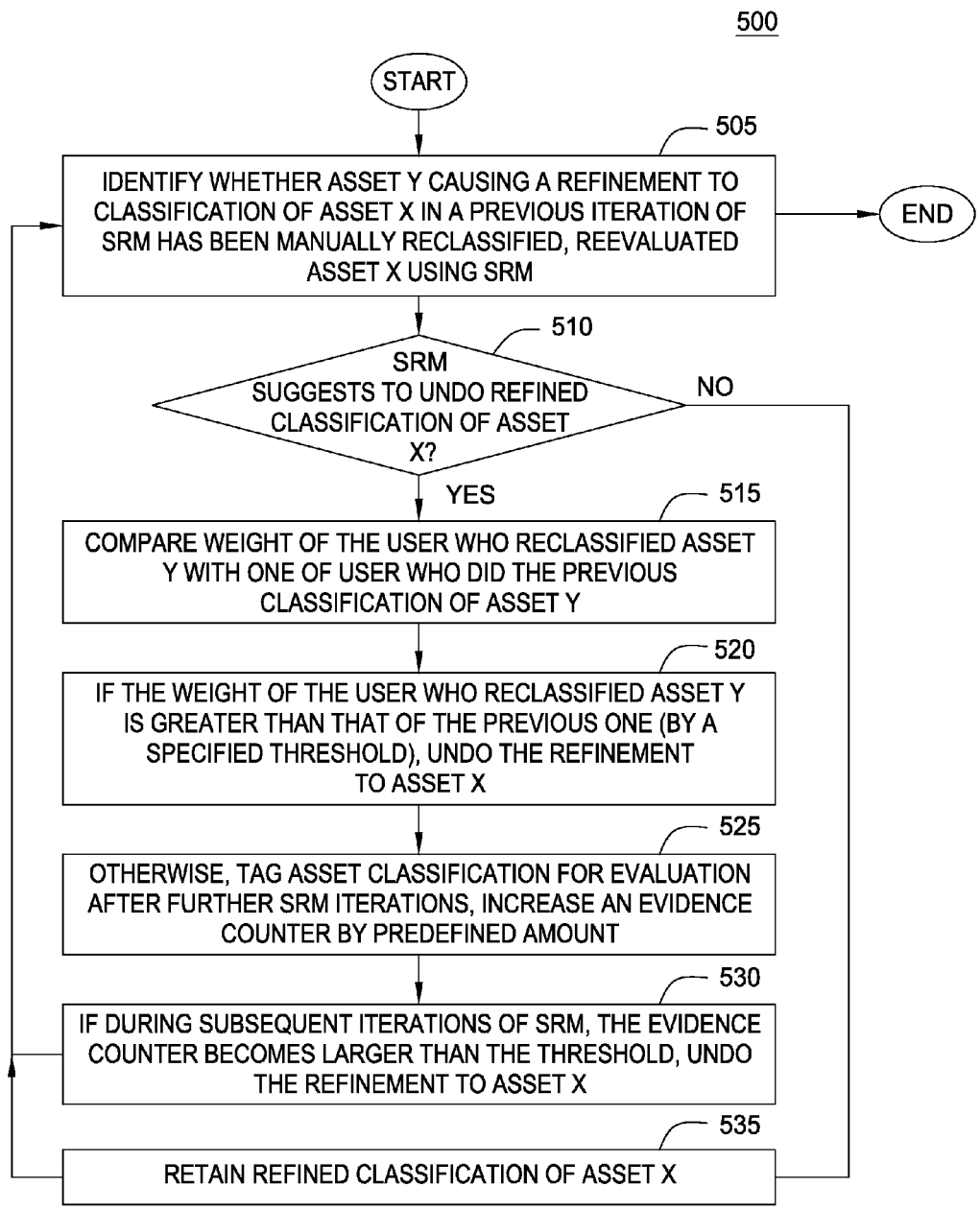
FIG. 5 illustrates a method for evaluating an asset classification refined using the method of FIG. 4, according to one embodiment of the invention.

For example, FIG. 5 illustrates a method 500 for evaluating an asset classification refined using the method of FIG. 4, according to one embodiment of the invention. As shown, the method begins at step 505, where the FECM identifies whether an asset (asset Y) which contributed to the refinement to the classification of another asset (asset X) in a previous iteration of SRM has manually been reclassified (or removed as an asset altogether). In response, the FECM invokes SRM to determine whether the refined classification of asset X should be undone, as a result of the changed classification of asset Y (or the removal of asset Y). That is, the FECM invokes the SRM to perform 415-430 of the method 400 of using asset X (with the original, unrefined classification of asset X). If the result is that asset X should retain the refined classification, i.e., if SRM still suggests to refine the classification of asset X given the current (changed) classification of asset Y (or the absence of asset Y), then nothing changes. That is, the current classification of asset X is retained (step 535).

Otherwise, at step 515, the FECM compares a weight assigned to the user who reclassified asset Y with a weight of the user that originally classified asset Y (i.e., the weight of the user gave asset Y the classification that led to the refinement to the classification of asset X). At step 520, if the weight of the user who reclassified asset Y is greater than the weight of the user that originally classified asset Y by a specified threshold, then FECM undoes the refinement to the classification of asset X. That is, if the user that reclassified asset Y has a sufficient credibility, then the original classification to asset Y may be suspect. Similarly, the refinement based on the original classification is also suspect—and may be undone. Stated the other way, if the user who made the original classification to asset Y has a weight that exceeds that of the user who reclassified asset Y, then the reclassification may be suspect, and the refined classification to asset X may be retained as a result. In the latter case, at step 525, the classification of asset X is tagged for further evaluation after further SRM iterations, as other refinements and manual classifications occur.

For example, in one embodiment, if the refinement to X is retained, the FECM may initialize a counter, incremented by certain pre-defined amount (e.g, 0.1) when more evidence (of the nature of the one discussed in 0052 above) for reclassification is uncovered during subsequent iterations of the SRM. If during any of the iterations, the evidence counter becomes larger than the threshold (e.g, 1.0), the refinement made to asset X may be undone (step 530). Alternatively, the SRM could continue iterating for a fixed number of times or a fixed time-window, before re-evaluating the evidence counter to determine whether to refine the classification to asset X.

Figure 8:
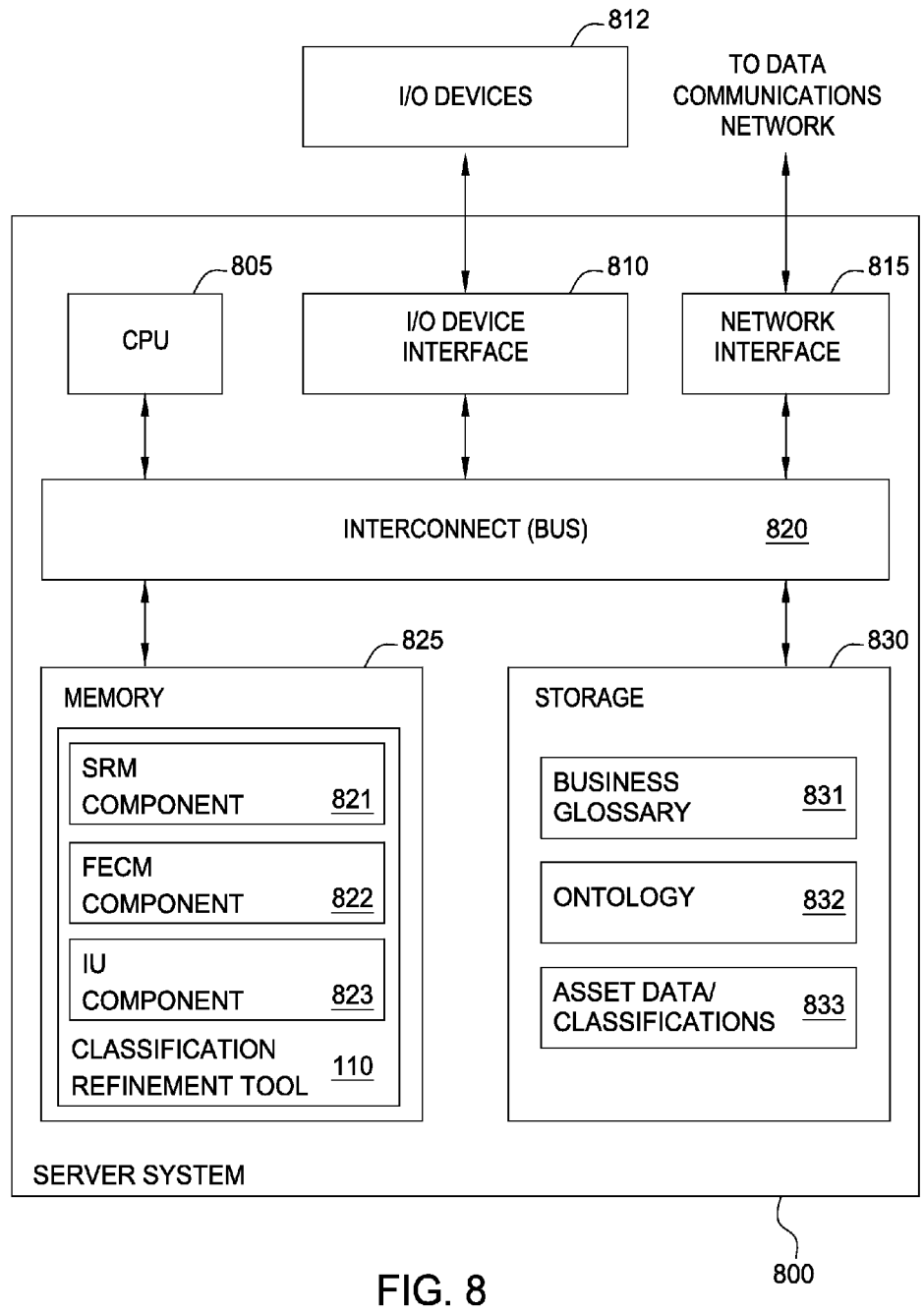
FIG. 8 illustrates an example computing system used to provide a classification refinement tool, according to one embodiment of the invention.

FIG. 8 illustrates an example computing system 800 used to provide a classification refinement tool, according to one embodiment of the invention. As shown, the server system 800 includes, without limitation, a central processing unit (CPU) 805, a network interface 815, an interconnect 820, a memory 825 and storage 830. The computing system 800 may also include an I/O device interface 810 connecting I/O devices 812 (e.g., keyboard, display and mouse devices) to the computing system 800.

The CPU 805 retrieves and executes programming instructions stored in the memory 825. Similarly, the CPU 205 stores and retrieves application data residing in the memory 825. The interconnect 820 facilitates transmission, such as of programming instructions and application data, between the CPU 805, I/O device interface 810, storage 830, network interface 815, and memory 825. CPU 805 is included to be representative of a single CPU, multiple CPUs, a single CPU having multiple processing cores, and the like. And the memory 825 is generally included to be representative of a random access memory. The storage 830 may be a disk drive storage device. Although shown as a single unit, the storage 830 may be a combination of fixed and/or removable storage devices, such as fixed disc drives, floppy disc drives, tape drives, removable memory cards or optical storage, network attached storage (NAS), or a storage area-network (SAN).

As shown, the memory 825 includes a classification refinement tool 110, which itself includes a semantic refinement module (SRM component 821), a feedback-enabled weighted calibration module (FECM component 822), and a user interface (U/I) component 823. And the storage 830 includes a business glossary 831, an ontology 832, and a set of asset data/classifications 833.

As described above, the (U/I) component 823 may provide an interface which allows a user (e.g., a subject matter expert or data steward) to assign terms in the business glossary 831 to asset data 833. The business glossary provides a controlled vocabulary of terms (and term definitions) used within the organization. Further, as users manually classify assets, the classification refinement tool 110 may invoke the SRM component 821 to identify whether the classifications assigned to certain assets can be refined based on the classifications of others. As described, e.g., the SRM component 821 may identify assets with a descendent classification in the business glossary 831 that also have more general (or equal) attributes in the ontology 832. If so, the SRM component 821 may refine the asset with the less specific classification (but having more specific—or equally specific—attributes) to the more specific classification.

Further, as asset classifications are changed, new classifications are added, or assets are removed from asset data/classifications 833, the FECM component 822 may determine whether the classifications of any assets contributing to refinements to other assets made by the SRM have changed. If so, the refinements to some assets may be undone. That is, should the classification of an asset contributing to a refinement change, the FECM component 822 may evaluate the refined classifications as well—potentially undoing the refinement.

Advantageously, embodiments of the invention provide techniques for refining the manual classification of assets classified or categorized using the terms of a business glossary. In one embodiment, a semantic refinement mechanism is used to refine the manual classification of such assets, as well as subsequently evaluate the refined asset classifications. Further, the refined asset classifications may be used as a training set for a machine learning classifier. Training the machine learning classifier using the refined asset classifications results in a classifier that may be used to more accurately perform automatic asset classification. Doing so allows datasets to be more rapidly merged into a common business glossary. The refined set of classifications may also be used by a variety of business analytics tools to analyze and evaluate an organization across a variety of metrics.

While the foregoing is directed to embodiments of the present invention, other and further embodiments of the invention may be devised without departing from the basic scope thereof, and the scope thereof is determined by the claims that follow.

What is claimed is:

1. A computer-implemented method for refining asset classifications, the method comprising:
   receiving a plurality of assets, each asset having a classification of a term, wherein each term is selected from a business glossary which provides a hierarchy of controlled vocabulary of terms used within an organization and wherein each asset is characterized using a set of attributes selected from a domain ontology; and
   upon determining a first term assigned to a first one of the assets satisfies a set of refinement criteria, refining the classification of the first asset by assigning the first asset a second term from the business glossary, wherein the second term is more precise in the business glossary than the first term and wherein the refinement criteria includes:
      determining that the term of a second one of the assets comprises a descendent of the classification of the first asset, and
      determining that each attribute of the first asset is at a lower level in the domain ontology than a corresponding attribute in the second asset.

2. The method of claim 1, further comprising:
   storing a reference to the first asset and to at least a second asset, wherein the second asset contributed to the refinement to the first asset, according to the set of refinement criteria.

3. The method of claim 2, further comprising:
   upon determining the second asset has been reclassified, reevaluating, by operation of the one or more computer processors, the refined classification assigned to the first asset against the refinement criteria.

4. The method of claim 3, further comprising:
   undoing the refined classification assigned to the first asset if the first asset no longer satisfies the set of refinement criteria.

5. The method of claim 3, further comprising:
   comparing a weight assigned to a user who assigned the classification to the second asset with a weight assigned to a user who reclassified the second asset;
   undoing the refined classification of the second asset if the weight of the user who assigned the classification to the second asset exceeds the weight assigned to the user who reclassified the second by a specified threshold; and
   retaining the refined classification of the second asset if the weight of the user who assigned the classification to the second asset does not exceed the weight assigned to the user who reclassified the second by the specified threshold.

6. The method of claim 1, further comprising, training a machine learning classifier based on the classifications assigned to the plurality of assets and further based on the refined classification assigned to the first asset.

* * * * *